March 5, 1940. R. F. JAMES 2,192,348
APPARATUS FOR THE TREATMENT AND STORAGE OF FOOD
Filed Dec. 4, 1937 2 Sheets-Sheet 1
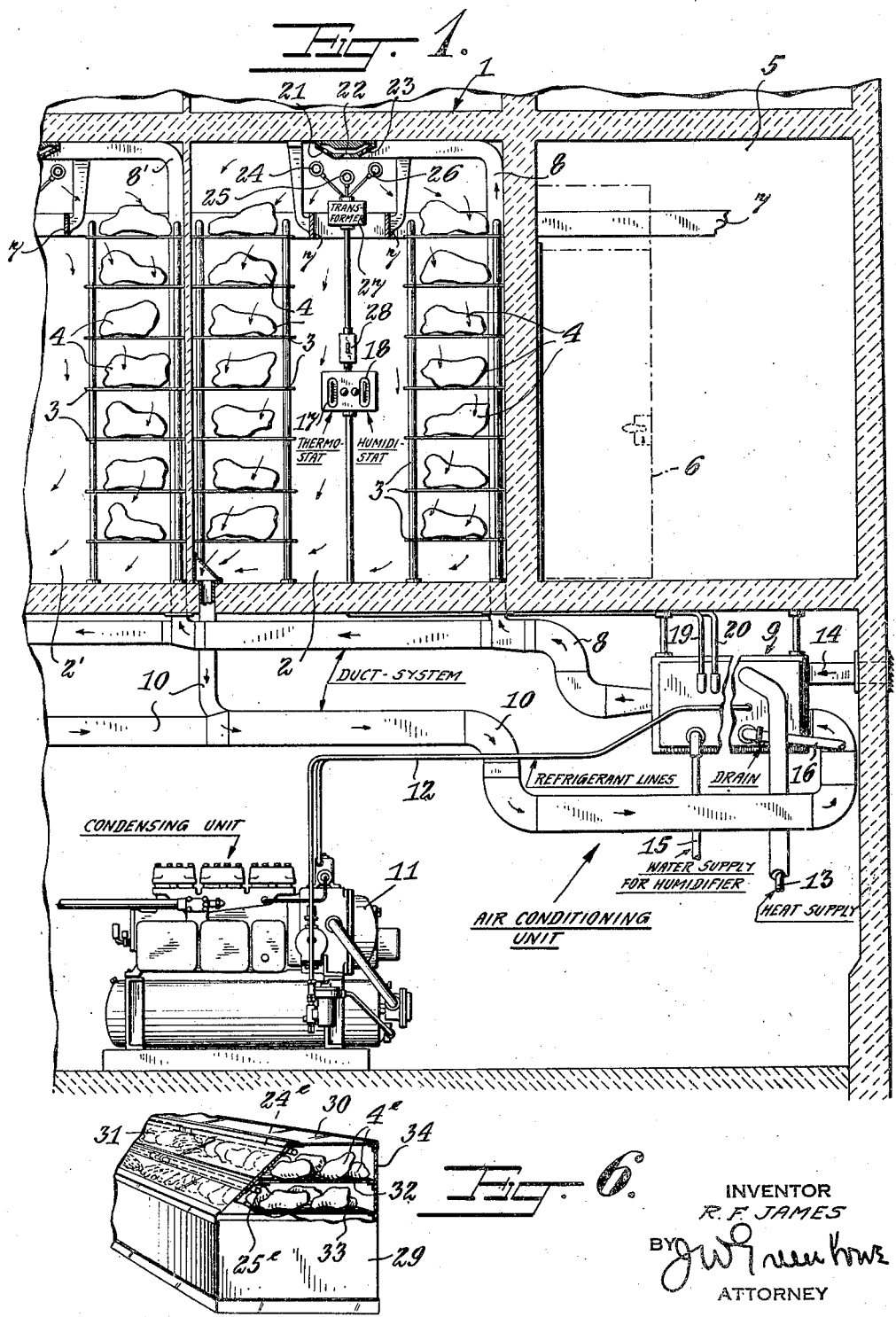
INVENTOR
R. F. JAMES
BY
ATTORNEY March 5, 1940. R. F. JAMES 2,192,348
APPARATUS FOR THE TREATMENT AND STORAGE OF FOOD
Filed Dec. 4, 1937 2 Sheets-Sheet 2
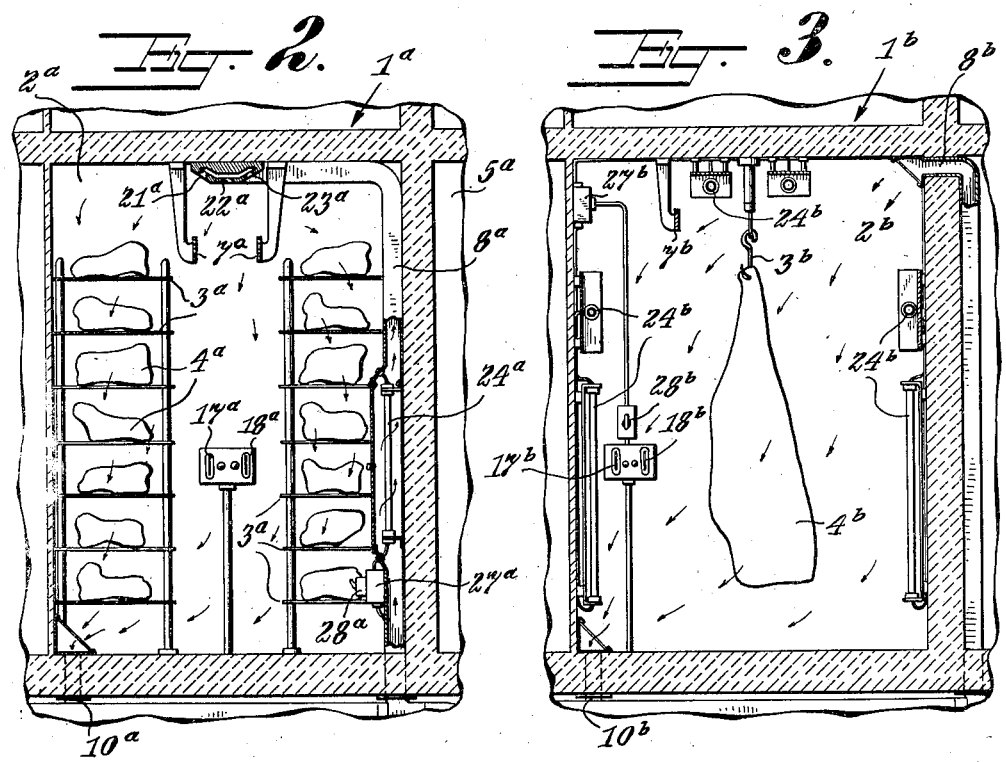
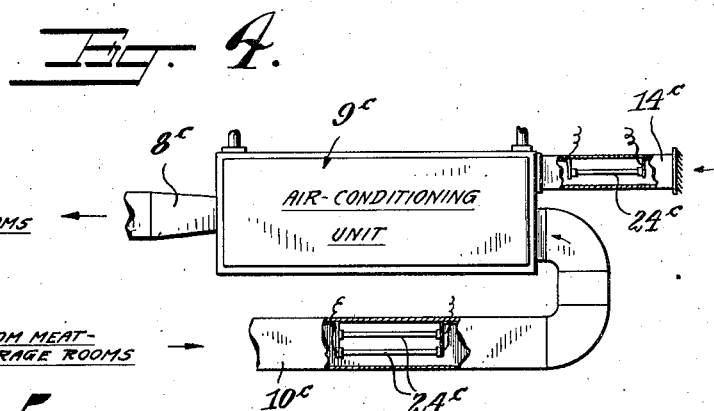
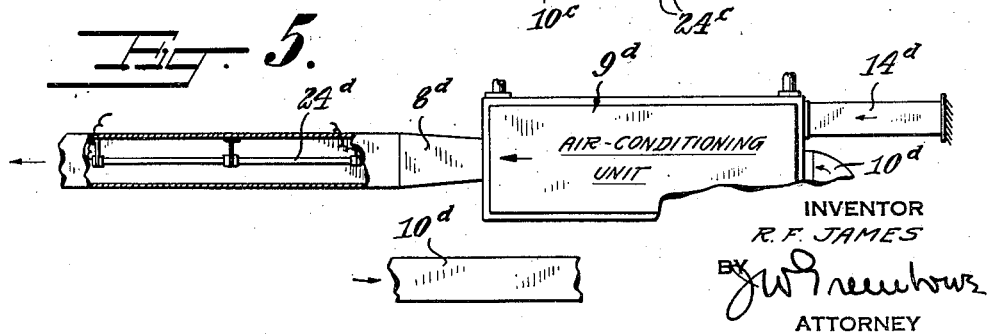
INVENTOR
R. F. JAMES
ATTORNEY Patented Mar. 5, 1940

2,192,348

UNITED STATES PATENT OFFICE 2,192,348

APPARATUS FOR THE TREATMENT AND STORAGE OF FOOD

Robert F. James, Mahwah, N. J., assignor to Westinghouse Electric & Manufacturing Company, East Pittsburgh, Pa., a corporation of Pennsylvania Application December 4, 1937, Serial No. 178,073

14 Claims. (Cl. 62—89)

This application is a continuation-in-part of my copending application Serial No. 131,987, filed March 20, 1937, for Process for the treatment of meat and the product thereof, now Patent No. 2,169,081, dated August 8, 1939 and owned by the same assignee.

This invention relates to the storage of food and the treatment of meat, and more particularly to an improved apparatus for the ripening and storing of meat.

The principal object of my invention, generally considered, is to control the process of tenderizing meat without spoilage, including the avoidance of the growth of mold and bacteria on such material during the process of tenderizing and storing, and the control of the temperature and the humidity.

Another object of my invention is to improve on the invention, described in the application of which this is a continuation-in-part, by providing apparatus for more accurately controlling the temperature and humidity at which meat is tenderized, while employing radiant-energy devices of the character used in accordance with said earlier application, to prevent spoilage of the meat and speed-up the tenderization thereof.

A further object of my invention is the production of tenderized meat free from objectionable taste and odor, retaining its original appearance and desirable flavor, and of greater food value, vitamin content, and digestability, than ordinary meat.

A still further object of my invention is the provision of improved apparatus for practicing my process of tenderizing meat.

Other objects and advantages of the invention, relating to the particular arrangement and construction of the various parts, will become apparent as the description proceeds.

In my copending application Serial No. 131,987, filed March 20, 1937, previously referred to, I described and claimed a process and apparatus for the treatment of meat, and meat produced by such process and in the apparatus disclosed. While practicing the method described in said application, I have found that by observing and controlling the steps of the method, including the accurate maintenance of temperatures and humidities within an optimum range, it is possible to produce results even superior to those heretofore obtained by my method, if temperature and humidity are not accurately controlled. For example, with the method of tenderizing described in said application, I have produced meat which is satisfactorily tenderized and possesses all the practical desirable qualities. Such meat sometimes has a slightly darkened and dehydrated surface layer, if the desired temperature and humidity is not maintained. This layer is in no way detrimental and entirely edible but, in some cases, in order to improve the appearance of the meat, it is considered desirable to remove said layer. Such trimming results in a slight loss and hence increases the cost of the final product to the ultimate consumer.

I have found that it is possible to practically avoid discoloration of the surface of the meat, treated in accordance with my invention, by the use of limiting devices to control the relative and absolute humidities within minimum and maximum limits for any given temperature treatment.

In my copending application referred to, I have shown that the time required to satisfactorily tenderize meat may be decreased, under ultraviolet radiation, by increasing the temperature during the treatment. Now I find that by accurately controlling the relative humidity of the air surrounding the meat during treatment, I can eliminate the surface darkening of the cut or exposed areas of the meat, thereby maintaining the desirable natural coloring of the meat tissue. I have further found that meat treated with such controlled humidity and temperature, may be directly butchered into retail cuts without the necessity of chilling to as low as 45° F., as is the customary practice.

The foregoing has been demonstrated in a commercial "walk-in" refrigerator in accordance with the following procedure:

I limit the desired absolute and relative humidities by using a direct evaporation type of humidifier with a suitable humidistat, which actuates the humidifier when the humidity falls below the desired relative humidity value. I measure the humidity with a sling psychrometer and when it is in excess of what I desire, I reduce it by automatically or manually operating a switch to energize an electric fan to circulate the air and cause it to pass over the refrigerating means, heat exchanger, or cooling pipes. The low temperature obtained in the refrigerating means, as by automatically or manually operating the heat exchanger valve, forces excessive moisture out of the air and reduces the humidity to within the desired limits. It will be appreciated that such control is necessary in maintaining the desired humidity, on account of infiltration of atmospheric air, having a humidity different from that desired, when the door of the refrigerator is open.

It will therefore be seen that I propose to automatically control the absolute and relative humidity of the air in a refrigerating compartment by the use of minimum and maximum limiting humidistats. The minimum humidistat actuates the humidifier and increases the moisture. The maximum humidistat causes a circulation of air over or past a cold area to remove moisture therefrom by chilling below the dew point. However, any suitable dehydrating method may be used. I prefer the chilling process because a refrigerator naturally contains a cold area which may serve for withdrawing moisture from the air by condensation thereon, either as dew or frost. This method is therefore economical and the source of refrigeration may be accurately controlled by any of the commercially known and available thermostats.

The results which I have obtained by the specified accurate control were unforeseen since, although I knew I had proven the usefulness of my method, as described in my previous application for tenderizing meat, I did not realize the degree of perfection obtainable by the step of more accurately controlling the humidity and temperature.

In the usual type of refrigerator or ice box in commercial use, it is necessary for the butcher to have access to the meat to remove portions from time to time. The opening of a door, under varying conditions of moisture in the outside air, serves to change the condition within the box, in spite of which it is possible to satisfactorily tenderize meat. With the atmosphere in the box accurately controlled, as to moisture as well as temperature, I have obtained results which are startling and beyond expectation, insofar as the appearance and character of the treated meat are concerned.

Referring now to the drawings illustrating improved apparatus embodying my invention:

Fig. 1 is a vertical sectional view of a refrigerator or meat treating compartment embodying my invention, the machinery underneath the compartment for conditioning the air supplied to the compartment being also fragmentarily illustrated.

Fig. 2 is a vertical sectional view of a refrigerator or meat treating compartment, as shown in Fig. 1, but slightly modified.

Fig. 3 is a view of apparatus similar to that shown in Fig. 2, but involving another modification.

Fig. 4 is a fragmentary side elevational view of air-conditioning apparatus, with portions broken away to more clearly show the bactericidal lamps contained therein.

Fig. 5 is a view similar to Fig. 4 but showing a modification.

Fig. 6 is a sectional perspective view of a show case embodying my invention.

Referring to the drawings in detail, like parts being designated by like reference characters, and first considering the embodiment of my invention illustrated in Fig. 1, there is shown a refrigerator or meat treating and storing device 1 comprising a room or compartment 2, provided with shelves, racks, or other means 3 for supporting and storing meat 4 and the like. Hooks (not shown) may be provided for suspending large pieces or carcasses of meat. The compartment 2 may be entered, if desired, through a vestibule or anteroom 5 having a door 6 leading to the outside. In order to provide for the transfer of meat to and from the compartment or room 2, and others of a series 2, 2' etc., a portion of the adjoining room 2' being illustrated, there are desirably provided rails or tracks 7 which lead from the vestibule 5 to the room 2 or rooms 2, 2', etc.

Although refrigerating coils may be disposed directly in the meat treating compartments 2, 2' etc., as in my copending application Serial No. 131,987, previously referred to, yet in the present arrangement I have shown the refrigerating means disposed outside of the compartment and the latter maintained at the desired temperature and humidity by circulating conditioned air therethrough, as by means of ducts or conduits 8, 8', etc., which supply the conditioned air to the compartments, the compartment air being forced out and returned to the refrigerating means 9 through return ducts 10.

The refrigerating means, air conditioner, or heat exchanger 9 is, in the present embodiment, shown connected to a condensing unit 11 by refrigerant lines 12, said lines feeding coils, or means having chilling surfaces, in the heat exchanger 9 over which the circulating air is forced. Inasmuch as I tenderize meat at relatively mild temperatures, heat supply pipes 13 are provided for use in cold weather instead of the refrigerant lines. Provision is made for recirculating most of the air which goes to and from the refrigerators or meat-treating compartments, but some air from the outside is desirably drawn into the system, as by means of duct or conduit 14.

The air conditioner 9 also desirably includes means for humidifying, as well as for cooling or heating, the air supplied to the treating chambers 2, 2', etc. For that purpose, there are provided a water supply pipe 15 for humidifying, and a drain pipe 16 for discharging surplus water and that condensed during a dehumidifying operation.

The operation of the air conditioner 9 is controlled by means of thermostat 17 and humidistat 18 through control circuits 19 and 20. The properly conditioned air is desirably fed by the ducts 8, 8', etc. to the rooms or meat-treating units 2, 2', etc., at the top through discharge orifices, or lines of orifices, 21, 22 and 23. Beneath these orifices are desirably disposed the means for generating ultra-violet light having the major part of its radiations near 2500 A. U., or between 2500 and 3000 A. U., with very little visible and infrared radiations, and hardly any of wave lengths below 2500 A. U., which means desirably takes, or take, the form of one or more lamps 24, 25, and 26, each lamp being desirably disposed directly in line with one of the discharge orifices, or lines of orifices, 21, 22 and 23, so that the air is sterilized most effectively by directly striking the lamps. Each lamp is desirably constructed in accordance with my copending application Serial No. 734,620, filed July 11, 1934, and owned by the asignee of the present application. These lamps desirably operate on a transformer 27 controlled by means of a switch 28.

In operation, air is caused to circulate through the air-conditioner 9, by any desired means, such as a fan (not shown), the thermostat controlling the temperature of the air supplied by the ducts 8, 8', etc., and the humidistat controlling the moisture content of said air within the desired limits. When the meat-treating chamber 2, for example, is too warm, the thermostat operates the condensing unit 11 to supply the desired refrigerating effect to the conditioner 9, so that the air is circulated over cold pipes, or other means with chilling surfaces, to be reduced in temperature to the desired extent. When the air in the heat-treating chamber 2 becomes too cold, the air is either diverted from the chilling area to a heating area maintained by the heat supply pipes 13, or the condensing unit is slowed down or shut off.

When the air is too dry, the humidistat 18 operates to cause the circulating air to take up water from the water supply provided. When, on the other hand, the air becomes too moist, in accordance with the setting of the humidistat, the humidifying operation is discontinued and the excess withdrawn from the air by a chilling action or other dehumidifying means.

It will therefore be seen that I have provided apparatus for automatically controlling the temperature and humidity within narrow limits, thereby avoiding the labor, previously entailed, of manually controlling such factors. The temperature is desirably maintained, as in my copending application Serial No. 131,987, previously referred to, at about 55° F., and the relative humidity is desirably maintained high, the exact percentage being dependent on the character of the meat treated; that is, whether it is naturally dry or moist. For example, fowl, such as chicken or game, are desirably tenderized in a moist atmosphere of approximately 100% relative humidity, because they are naturally dry. Lamb and pork, being naturally moist, are desirably tenderized in an atmosphere having a relative humidity of about 90%. Steps are now being taken to accurately determine the optimum times, temperatures and humidities for treating different kinds of meat.

Referring now to the embodiment of my invention illustrated in Fig. 2, there is shown a refrigerator or meat treating and storing device $1^a$, comprising a room or compartment $2^a$, provided with shelves, racks, or other means $3^a$, for supporting and storing meat $4^a$ and the like. Hooks, not shown, may also be provided for large pieces or carcasses of meat, as in the preceding embodiment. The compartment $2^a$ may be entered, if desired, through a vestibule or anteroom $5^a$ having a door (not shown) leading to the outside. As in the preceding embodiment, rails or tracks $7^a$ may be provided for transferring meat to and from the compartment or room $2^a$ and other compartments of a series, if such is used, as in the preceding embodiment.

The means for refrigerating and/or air-conditioning the compartment $2^a$ of the present embodiment may be identical with that of the preceding embodiment, except that in the present embodiment the ultra-violet lamp, or lamps $24^a$, is, or are, positioned in the duct or conduit $8^a$ through which conditioned air is fed to the room or meat-treating chamber $2^a$, through discharge orifices, or lines of orifices, $21^a$, $22^a$, and $23^a$. The air is allowed to return to the air-conditioning means through return conduit $10^a$. As in the preceding embodiment, the ultra-violet lamp, or lamps, is, or are, operated on a transformer $27^a$ and controlled by a switch $28^a$, and the air-conditioning equipment is controlled, so that the desired temperature and humidity are at all times maintained in the compartment by means of a thermostat $17^a$ and a humidistat $18^a$, through suitable control lines, as in the preceding embodiment.

It will therefore be seen that I have provided apparatus for controlling the temperature and humidity of meat stored and/or treated for tenderizing purposes. The only difference in the apparatus of the present embodiment, as compared with that of the preceding embodiment, is that the air which is supplied to the meat is sterilized and activated while in the duct or conduit through which it passes prior to reaching the meat, and no radiations from the ultra-violet lamp or lamps $24^a$ fall directly on the meat.

Referring now to the embodiment of my invention illustrated in Fig. 3, there is shown a refrigerator or meat-treating and storing device $1^b$, comprising a room or compartment $2^b$, provided with means such as hooks $3^b$ for supporting pieces of meat $4^b$. The compartment may be entered, as in the first embodiment, and may be one of the series of compartments, if such is desired. Tracks or rails $7^b$ are desirably provided for the transfer of meat to and from said compartment $2^b$.

In the present embodiment I have provided for the direct irradiation of all outer surfaces of the meat, by positioning ultra-violet generating units $24^b$, corresponding with the units $24$ of the first embodiment, so that the meat receives radiations therefrom on all sides. The air is kept in the proper condition by being circulated, as in the preceding embodiments, from an inlet duct or conduit $8^b$ and withdrawn through an outlet duct or conduit $10^b$, the air supplied to the inlet duct being conditioned, as by controlling the temperature and humidity in accordance with the setting of the thermostat $17^b$ and the humidistat $18^b$, by means of apparatus such as the air-conditioning equipment described in connection with the first embodiment. Operation of the lamps $24^b$, some of which may be vertical and disposed along the walls, others of which may be horizontal and disposed along the walls, and still others horizontal and disposed along the ceiling, may be controlled by means of a switch $28^b$, said lamps operating on a transformer $27^b$.

It will, therefore, be seen that I have provided apparatus for treating and/or storing meat including means for accurately maintaining the desired temperature and humidity of the air surrounding said meat, as well as providing for directly irradiating the surface of the meat from all sides, in order to most efficiently protect the same from spoilage and increase the speed of tenderization.

Referring now to the embodiment of my invention illustrated in Fig. 4, a modified air-conditioning unit $9^c$ is illustrated, which may correspond with the air-conditioning unit 9 of the embodiment of Fig. 1 in that it is provided with means for heating or cooling, in accordance with the setting of a control thermostat, and means for humidifying or dehumidifying, in accordane with the setting of a control humidistat. This air-conditioning unit, however, may be employed with meat storage rooms having no ultra-violet generating means, like the storage room $2^a$ of Fig. 2, the duct or conduit $8^c$ being provided for supplying such a room or rooms with conditioned air. This is made possible by sterilizing and activating the air, prior to reaching said unit, by means of ultra-violet lamps $24^c$, some of which are positioned in the main return duct $10^c$ from the meat-storage or treating room, not shown, and the remainder in the fresh-air supply duct $14^c$, so that all air supplied to the meat storage room or rooms is sterilized and activated like the air supplied by the duct $8^a$, of the embodiment of Fig. 2, by passing over and around the ultra-violet light generating means $24^c$.

Referring now to the embodiment of my invention illustrated in Fig. 5, there is shown an air-conditioning unit $9^d$, which desirably corresponds with the unit 9 of the first embodiment. In the present case, however, the return duct $10^d$ and the fresh-air supply duct $14^d$ are not furnished with sterilizing devices, such devices $24^d$ being instead applied in the main duct of the supply line $8^d$, so that the conditioned air fed from said unit is sterilized after leaving the same, but before it reaches the meat storage and/or tenderizing room, not shown.

Referring now to the embodiment of my invention illustrated in Fig. 6, there is shown a refrigerating show case 29, in the form of a display cabinet having the glass top 30 and a glass front 31. Means such as shelves 32 and 33, preferably in the form of grills, are provided for supporting food 4e, such as cuts of meat, sausage, chicken, and prepared meat in the form of loaves, as well as other food products such as cheese and the like. Ultra-violet lamps 24e and 25e are desirably positioned, as illustrated, so as to run along the front of the show case and irradiate the food stored on the shelves therebelow. The lamp, or lamps 24e, is, or are, desirably positioned near the vertex of the angle between the top and front walls, as illustrated. Access to the show case 29 may be provided for in the usual manner, as by means of a sliding door portion (not shown) in the rear wall 34.

Such a show case or other form of refrigerator with lamps mounted above the food for irradiating the same may be employed for the reception and storage of meat, after tenderization in the apparatus illustrated in Figs. 1, 2, and 3, or other food products after preparation, such as sausage and cheese. The temperature in the show case is desirably maintained, by suitable refrigerating apparatus, not shown, lower than in the meat-treating compartment, in order to hold the tenderized meat in the optimum condition until disposed of, without allowing further rapid tenderizing action. It is found, however, that meat and other food held in such a refrigerator or show-case under the influence of the ultra-violet light radiated by lamps such as disclosed, will keep much better than at the same temperature in a show case or other compartment when not irradiated by such light. It has also been found that food, such as sausage meat, which ordinarily spoils rapidly when not protected by irradiations from ultra-violet lamps, may be kept for a considerable period of time without any appreciable deterioration.

It has been found by utilizing my invention that, for example, sausage meat, which has a better flavor when allowed to season for several days, may be made up a considerable time before the sale thereof without an objectionable crust forming on its surface.

Although it is not necessary that the air in the show case or display cabinet 29, such as illustrated, be conditioned, as in the treatment compartments previously described, yet it will of course be understood that this may be done if desired, as by means of air-conditioning equipment connected to the cabinet by means of supply and return air ducts, as in previous embodiments. It will also be understood that although the show case 29 is primarily for holding food such as meat, which has been tenderized in the treating apparatus previously described, and therefore the normal temperature in such a show case is in the neighborhood of 35° F., yet it will be understood that I may actually rapidly tenderize meat in such a show case by keeping the temperature higher than normal and conditioning the air therein by apparatus such as previously described.

It will also be understood that although the air is preferably conditioned by accurately maintaining a high moisture content and a carefully regulated temperature, yet, on account of the usual procedure of opening a show case frequently, this control cannot be as accurately maintained as in a tenderizing compartment such as previously described. It has been found, however, that while the close control of the temperature and humidity of the air which surrounds the meat being treated is desirable, yet it is not essential for accomplishing some of the results of my invention.

I have also found that I can tenderize meat under the lamps at a greater speed than meat was formerly tenderized by the old method of "hanging," even though the temperature of about 35° F., and other factors are unchanged. That is, I can tenderize meat, which formerly took about four weeks by the old method of "hanging" at about 35° F., in from two to less than three weeks to the same degree of tenderness, when the ultra-violet lamps are employed for irradiation during the period of treatment, without other change.

From the foregoing disclosure, it will be seen that I have provided apparatus for controlling the temperature and humidity of rooms or compartments in which food may be stored or meat tenderized. The temperature and humidity is desirably automatically controlled by a suitable thermostat and humidistat connected by control lines to air-conditioning equipment, which maintains the air in the desired state, insofar as temperature and humidity are concerned, within narrow limits. The air is sterilized and activated either after being supplied to the food storage room, immediately before its discharge from the air duct feeding said room, or immediately before passing into, or after leaving, the air conditioning apparatus.

Although my invention has been shown applied to a "walk-in" refrigerating room or compartment, and a refrigerating show-case, it will be understood that I do not wish to be limited to this showing as, if desired, it may be applied to other devices for holding, storing, displaying, or treating meat of other food.

It will also be understood that although preferred embodiments of my invention have been illustrated, I do not wish to be limited thereto, as modifications may be made within the spirit and scope of the appended claims.

I claim:

1. In apparatus for tenderizing and/or storing meat or other food, the combination of a compartment, means for supporting meat in the compartment, means including control means for maintaining desired temperatures and humidities in the compartment, said control means maintaining a temperature of between 35 and 55° F. and a relatively high humidity in the compartment, and ultra-violet radiating means for inhibiting the growth of bacteria and molds on the surface of the meat stored in the compartment.

2. In apparatus for tenderizing and/or storing meat or other food, the combination of a compartment, means for supporting meat in the compartment, means including control means for maintaining desired temperatures and humidities in the compartment, said control means maintaining refrigerated temperature in the compartment and a relative humidity of about 90%, and ultra-violet radiating means for inhibiting the growth of bacteria and molds on the surface of the meat stored in the compartment.

3. In apparatus for tenderizing and/or storing meat or other food, the combination of a compartment, means for supporting meat in the compartment, means including control means for maintaining desired temperatures and humidities in the compartment, said control means maintaining a refrigerated temperature in the compartment and a relative humidity of between 90 and 100%, and ultra-violet radiating means for inhibiting the growth of bacteria and molds on the surface of the meat stored in the compartment.

4. In apparatus for tenderizing and/or storing meat or other food, the combination of a compartment, means for supporting meat in the compartment, means including control means for maintaining desired temperatures and humidities in the compartment, said control means maintaining a temperature of between 35 and 55° F. in the compartment and a relative humidity of between 90 to 100%, and ultra-violet radiating means for inhibiting the growth of bacteria and molds on the surface of the meat stored in the compartment.

5. In apparatus for tenderizing and/or storing meat or other food, the combination of a compartment, means for supporting meat in the compartment, means including control means for maintaining desired temperatures and humidities in the compartment, said control means maintaining a temperature of approximately 55° F. in the compartment and a relative humidity of about 90%, and ultra-violet radiating means for inhibiting the growth of bacteria and molds on the surface of the meat stored in the compartment.

6. In apparatus for tenderizing and/or storing meat or other food, the combination of a compartment, means for supporting meat in the compartment, means including control means for maintaining desired temperatures and humidities in the compartment, said control means maintaining a refrigerated temperature in the compartment and a relatively high humidity therein, and ultra-violet radiating means substantially restricted to 2500 to 3000 A. U. wave lengths for inhibiting the growth of bacteria and molds on the surface of the meats in said compartment.

7. In apparatus for tenderizing and/or storing meat or other food, the combination of a compartment, means for supporting meat therein, means including control means for maintaining desired temperatures and humidities in said compartment, said control means maintaining a temperature above 45° F. and a high relative humidity therein, and ultraviolet radiating means for inhibiting the growth of bacteria and molds on said meat.

8. In apparatus for tenderizing and/or storing meat or other food, the combination of a compartment, means for supporting meat in said compartment, means including control means for maintaining desired temperatures and humidities in said compartment, said control means maintaining a temperature of between 35 and 55° F. and a relative humidity of about 90% in the compartment, and ultra-violet radiating means for inhibiting the growth of bacteria and molds on the surface of meat in said compartment.

9. In apparatus for tenderizing and/or storing meat or other food, the combination of a compartment, means for supporting meat therein, means including control means for maintaining desired temperatures and humidities in said compartment, said control means maintaining a temperature above 45° F. and a relative humidity of about 90% in the compartment, and ultra-violet radiating means for inhibiting the growth of bacteria and molds on meat in said compartment.

10. In apparatus for tenderizing and/or storing meat or other food, the combination of a compartment, means for supporting meat therein, means including control means for maintaining desired temperatures and humidities in said compartment, said control means maintaining a refrigerated temperature and a relative humidity of about 90% in the compartment, and means for generating ultra-violet radiations substantially restricted to the band between 2500 and 3000 A. U. for inhibiting the growth of bacteria and molds on the surface of meat in said compartment.

11. In apparatus for tenderizing and/or storing meat or other food, the combination of a compartment, means for supporting meat therein, means including control means for maintaining desired temperatures and humidities in said compartment, said control means maintaining a temperature above 45° F. and a relatively high humidity in said compartment, and means for generating ultra-violet radiations substantially restricted to the band between 2500 and 3000 A. U. for inhibiting the growth of bacteria and molds on meat in said compartment.

12. In apparatus for tenderizing and/or storing meat or other food, the combination of a compartment, means including control means for maintaining desired temperatures and humidities in said compartment, said control means maintaining a refrigerated temperature and a relatively high humidity therein, means for generating ultra-violet radiations substantially restricted to the band between 2500 and 3000 A. U. for inhibiting the growth of bacteria and molds on meat in said compartment, and means for circulating air over said generating means.

13. In apparatus for tenderizing and/or storing meat or other food, the combination of a compartment, means for supporting meat therein, means including control means for maintaining desired temperatures and humidities in said compartment, said control means maintaining a refrigerated temperature and a relatively high humidity therein, a duct connected to said compartment for carrying air with respect thereto, means disposed in said duct for generating ultra-violet radiations substantially restricted to the band between 2500 and 3000 A. U. for conditioning the air for inhibiting the growth of bacteria and molds on the surface of meats in said compartment, and means for circulating air over said generating means and into and out of said compartment.

14. In apparatus for tenderizing and/or storing meat or other food, the combination of a compartment, means for supporting meat therein, means including control means for maintaining desired temperatures and humidities in said compartment, said control means maintaining a refrigerated temperature and a relatively high humidity therein, and ultra-violet radiating means disposed in said compartment adjacent the vertex of the angle between its top and front walls, so as to directly irradiate food kept therein and prevent it from spoilage, said means generating radiations substantially restricted to the band between 2500 and 3000 A. U. in order to be particularly effective for inhibiting the growth of bacteria and molds on the surface of meat.

ROBERT F. JAMES.